United States Patent [19]

Gilliland

[11] 3,984,346

[45] Oct. 5, 1976

[54] METHOD OF FORMING A HIGH EFFICIENCY PHOSPHOR FOR PHOTOCHROMIC GLASS INFORMATION DISPLAY SYSTEMS

[75] Inventor: John W. Gilliland, Raleigh, N.C.

[73] Assignee: Corning Glass Works, Corning, N.Y.

[22] Filed: June 2, 1975

[21] Appl. No.: 582,852

Related U.S. Application Data

[63] Continuation of Ser. No. 401,176, Sept. 27, 1973, abandoned, which is a continuation of Ser. No. 176,586, Aug. 31, 1971, abandoned, which is a continuation-in-part of Ser. No. 70,243, Sept. 8, 1970, abandoned.

[52] U.S. Cl. ........................................ 252/301.4 F
[51] Int. Cl.$^2$ ........................................ C09K 11/34
[58] Field of Search ............................. 252/301.4 F

[56] References Cited

UNITED STATES PATENTS

| 3,208,950 | 9/1965 | Yocom et al. ............ 252/301.4 F X |

FOREIGN PATENTS OR APPLICATIONS

| 820,943 | 9/1959 | United Kingdom .......... 252/301.4 F |
| 1,094,313 | 3/1966 | United Kingdom .......... 252/301.4 F |
| 714,057 | 8/1954 | United Kingdom .......... 252/301.4 F |
| 744,979 | 2/1956 | United Kingdom .......... 252/301.4 F |

OTHER PUBLICATIONS

Gilliland, "Journal of Luminescence," vol. 4, No. 4, 1971, pp. 345–356.
Bril, "The Luminescence of Organic and Inorganic Materials," John Wiley & Sons, 1962, pp. 471–493.

*Primary Examiner*—Jack Cooper
*Attorney, Agent, or Firm*—Walter S. Zebrowski; Clarence R. Patty, Jr.

[57] ABSTRACT

A process for making $BaSi_2O_5$:Pb having a high energy conversion efficiency of ultraviolet emission under electron bombardment. The process includes mixing $BaCO_3$, $BaF_2$, $Pb(NO_3)_2$ and $SiO_2$ in a form having extremely small particle size so as to facilitate complete dispersal of the $SiO_2$ in the mixture. $Pb(NO_3)_2$, a soluble salt, is mixed with the other ingredients in a slurry of alcohol. The soluble salt dissolves in the alcohol to obtain complete dispersal of lead throughout the mixture. After mixing the other ingredients and before firing, $H_3BO_3$ is added. The product $BaSi_2O_5$:Pb is used as a high efficiency phosphor in combination with photochromic glass in an information display system.

2 Claims, 4 Drawing Figures

METHOD OF FORMING A HIGH EFFICIENCY PHOSPHOR FOR PHOTOCHROMIC GLASS INFORMATION DISPLAY SYSTEMS

CROSS-REFERENCE TO RELATED APPLICATIONS

This is a continuation of application Ser. No. 401,176 filed Sept. 27, 1973 now abandoned; which was a continuation of application Ser. No. 176,586 filed Aug. 31, 1971, now abandoned; which was a continuation-in-part of application Ser. No. 70,243 filed Sept. 8, 1970, now abandoned.

BACKGROUND OF THE INVENTION

This invention relates to a method for making an improved phosphor. This invention also relates to the use of the improved phosphor in an information display device having photochromic glass.

Optical information storage and display devices of the type including a cathode ray display tube have recently come into accepted commercial use. In one such device, a cathode ray beam is addressed across a phosphor screen which in turn excites a plate of photochromic glass. Ultraviolet emission from the phosphor screen darkens the photochromic glass. The image created in the photochromic glass is read out with a suitable optical system. Systems of this type are described in Italian Pat. No. 845,551 — Megla and Ludovici (corresponding to U.S. application Ser. No. 677,185 filed Oct. 23, 1967).

The phosphors used in these systems have, in general, been developed for other purposes, such as television and fluorescent lamps. In general the efficiency of emission in the visible spectrum is important. On the other hand, in information display systems using photochromic glass the ultraviolet emission is particularly important because light of this wavelength darkens the photochromic glass.

Existing commercial processes for making phosphors emphasize the production of phosphors in large batches. While such techniques are suitable for the production of phosphors for use in particular applications such as television tubes, they are not suitable for the production of phosphors for photochromic glass display systems. For example, present commercial processes for producing $BaSi_2O_5$:Pb result in a product which does not have the desired high efficiency for use in these systems. The $BaSi_2O_5$:Pb produced commercially is therefore best used in other applications, for example, as a black light phosphor in fluorescent lamps.

SUMMARY OF THE INVENTION

In accordance with one aspect of this invention, an improved $BaSi_2O_5$:Pb phosphor is provided having a high conversion efficiency of ultraviolet emission energy relative to electron bombardment.

In accordance with another aspect of this invention, the improved $BaSi_2O_5$:Pb phosphor is produced by a process including mixing $BaCO_3$, $BaF_2$, and $Pb(NO_3)_2$ with $SiO_2$. Since the reaction which produces $BaSi_2O_5$:Pb takes place in the solid state, thorough mixing is essential. This is greatly facilitated by using $SiO_2$ in a form having extremely small paticle size, for example, a particle size of approximately .01 microns as a nominal dimension.

In accordance with another aspect of the invention, boron may be added to the phosphor mixture. The boron which may be added in the form of boric acid results in an even higher conversion efficiency for the phosphor.

In accordance with another aspect of this invention, the lead is introduced into the mixture as a soluble salt. The soluble salt is mixed with the other ingredients in a slurry of alcohol. The soluble salt dissolves in the alcohol to obtain complete dispersal of the lead throughout the mixture.

In accordance with another aspect of this invention, reactivity of components is assisted by the disassociation of $BaCO_3$ during the firing.

In accordance with yet another aspect of this invention, the efficiency of the $BaSi_2O_5$:Pb is enhanced by maintaining the highest standards of cleanliness during all stages of the process. In particular, purity is enhanced by firing the mixture in a clean air atmosphere of a furnace lined with high purity fused quartz.

In accordance with still another aspect of this invention, information display devices of the type having photochromic glass are improved in operating characteristics by using the improved $BaSi_2O_5$:Pb phosphors produced by this process.

The foregoing and other objects, features and advantages of the invention will be better understood from the following more detailed description, appended claims and drawings.

DETAILED DESCRIPTION

The present invention achieves a relatively high maximum conversion efficiency for ultraviolet emission (the ratio of ultraviolet emission energy relative to electron bombardment energy) in the phosphor barium disilicate doped with lead, $BaSi_2O_5$:Pb. A relatively high maximum conversion efficiency for $BaSi_2O_5$:Pb is defined, for purposes of this specification, as at least 4% as compared with the maximum conversion efficiency for prior art $BaSi_2O_5$:Pb of less than 4 percent.

Figure 1:
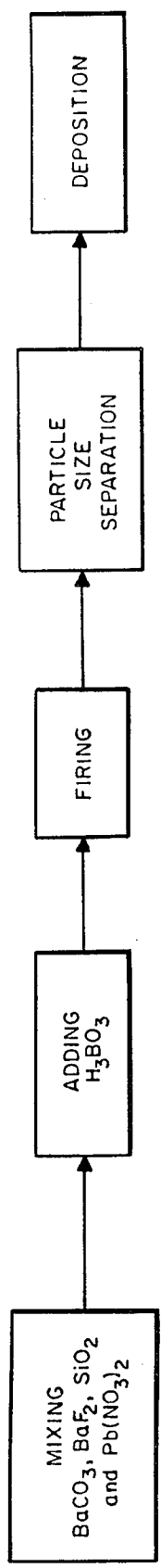
FIG. 1 is a flow diagram depicting the steps of the process for making the improved $BaSi_2O_5$:Pb phosphor and improved $BaSi_2O_5$:Pb phosphor screens.

The process for producing $BaSi_2O_5$:Pb having relatively high efficiency for emission of ultraviolet light under electron bombardment conversion is shown in FIG. 1. The process includes mixing ingredients $BaCO_3$, $BaF_2$, $SiO_2$ and $Pb(NO_3)_2$ in a slurry of methyl alcohol. Thorough mixing is essential since the reaction takes place in a solid state. Several aspects of the process of the present invention facilitate this mixing.

The use of $SiO_2$ in dry granular form characterized by extremely small particle size facilitates good mixing. The use of $SiO_2$ in the dry granular form is a departure from the more normal use of silicic acid in dry granular form to yield $SiO_2$. (Normally $H_{2x}SiO_{2+x}$ is added to the mixture to yield $SiO_2 + H_2O$.) The use of silicic acid yields a product of lower conversion efficiency than the use of $SiO_2$ in dry granular form. Normally, the $SiO_2$ is the hardest component to diffuse in the mixture. By using $SiO_2$ in a form having extremely small particle size, 0.01 microns as a nominal dimension for example, complete dispersal is assured. In this form, the particles of $SiO_2$ cling to form chainlike structures which make the solvent more viscous. These chainlike structures promote good dispersion of the $SiO_2$ throughout the mixture, and maintain a more homogeneous suspension by preventing the settling out of other components.

Other factors facilitating good mixing are the introduction of Pb into the slurry as the soluble salt $Pb(NO_3)_2$. When the soluble salt $Pb(NO_3)_2$ dissolves, complete dispersion of the lead throughout the mixture is obtained.

After the ingredients are mixed and dried, they are fired in a clean air atmosphere in covered containers of fused silica. The furnace in which the material is fired is lined with purity quartz, e.g., 99.98% $SiO_2$. In the absence of $H_3BO_3$, the heating of the ingredients produces the following reaction:

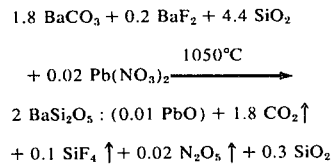

(In the foregoing, the molar fractions have been used instead of the more normal practice of normalizing to integer molar quantities.) The decomposition of $BaCO_3$ during the prefiring creates atomic rearrangement and motion which promotes the reaction. The extreme fineness and amorphous state of the $SiO_2$ also favors complete reaction of components since $SiO_2$ is very slow to diffuse. The fluoride ions diffuse readily through the system replacing oxygen atoms and thereby causing disruption of the Si—O bond along its path. This effect also improves reactivity and promotes crystallization.

Boron in the form of boric acid $H_3BO_3$ may be added to the mixture before firing. The presence of $H_3BO_3$ in the mixture affects the $SiO_2$ in such a manner so as to form a more viscous slurry. The order of mixing the ingredients in the mixture is therefore very important. All the ingredients except $H_3BO_3$ are mixed thoroughly before the $H_3BO_3$ is added so that the resulting higher viscosity of the slurry does not affect the mixing of the other ingredients. $H_3BO_3$ itself is soluble in the methyl alcohol slurry so that the $H_3BO_3$ is distributed uniformly throughout the whole mixture when added thereto. The mixture is then fired in the furnace.

It is believed that the boric acid affects reaction 1 in the following way. During the warm-up time in the firing cycle, the $H_3BO_3$ decomposes to form $B_2O_3$. Without adding the $H_3BO_3$, some of the fluoride is disspelled as $SiF_4$, a gas formed from the reaction between the solids $SiO_2$ and $BaF_2$. By weighing many charges before and after firing, it has been estimated that one half of the fluoride is released by this process. A similar reaction can therefore occur between the fluoride and the $B_2O_3$ producing $BF_3$ in the form of a gas. This reaction provides a second mechanism for freeing the phosphor material of the fluoride which is believed to account for the further increase in efficiency observed when $H_3BO_3$ is present.

Although the presence of boron in the mixture will not prevent the formation of $SiF_4$, it is believed that the $BF_3$ provides a more efficient removal of fluoride for two reasons: (1) $B_2O_3$ is a liquid at the reaction temperature so that it should react more readily than the $SiO_2$, and (2) from a purely statistical point of view, a trifluoride molecule can be formed more readily than a tetrafluoride molecule.

Thermogravimetric analysis of a sample made with 20 M% $BaF_2$ appropriately compensated with boric acid shows a weight loss of 95 percent of the theoretical indicating that essentially all the fluoride is expelled when boric acid is used. It is therefore believed that the reaction with $H_3BO_3$ may be expressed as follows:

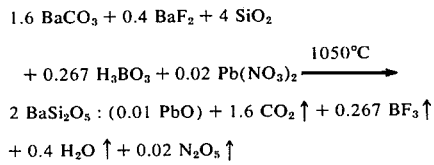

Note that the component ratios of the mixture in equation 2 differ from those of equation 1. When $H_3BO_3$ is utilized as in equation 2, a higher $BaF_2$ content can be used to advantage because of the more efficient fluoride removal afforded by $H_3BO_3$. Also, the presence of $H_3BO_3$ eliminates the requirement for excess $SiO_2$.

The next indicated step in the flow diagram of FIG. 1 is particle size separation. One suitable type of separation technique is elutriation in which the particles are placed in a slurry and the larger size particles settle out. Alternatively, the particle size can be reduced by light milling, although this is not necessary in general. Too much milling can adversely affect the aging characteristics of the phosphor.

The final step in the process is the deposition of the phosphor on the plate of photochromic glass.

A more detailed description of the process is given below. The details of this process are given only by way of example and are not intended to limit the invention.

I. Ingredients

|  | Equation 1 | Equation 2 |
|---|---|---|
| $BaCO_3$ | 1.8 moles–356 grams | 1.6 moles–316 grams |
| $BaF_2$ | 0.2 moles–35.1 grams | 0.4 moles–70.2 grams |
| $SiO_2$(Cab-O-Sil) | 4.4 moles–264 grams | 4.0 moles–240 grams |
| $H_3BO_3$ | — — | 0.267 moles–16.5 grams |
| $Pb(NO_3)_2$ | 0.02 moles–6.6 grams | 0.02 moles–6.6 grams |

The barium carbonate, barium fluoride, and lead nitrate of reagent grade from Fisher Scientific Company or Mallinckrodt Chemical Works may be used. The silica is purchased from Cabot Corporation under the name of Cab-O-Sil. $H_3BO_3$ purchased from Fisher Scientific Company may be utilized. The optimum amount of $H_3BO_3$ to be used in the mixture is related directly to the amount of fluoride in the mixture in the form of $BaF_2$ so as to be consistent with the following reaction:

$$3BaF_2 + 2H_3BO_3 \rightarrow 3BaO + 2BF_3 + 3H_2O. \qquad (3)$$

II. Mixing

The ingredients absent the $H_3BO_3$ are mixed in a slurry of electronic grade methyl alcohol (Mallinckrodt). The slurry is stirred for 24 hours and the H₃BO₃ may then be added with stirring continuing for 1 to 2 hours. Afterward heat (70°C to 100°C) is applied to evaporate the methyl alcohol. A carrier gas, clean nitrogen, is passed over the slurry to carry the alcohol vapors away. Stirring should continue as long as possible, while drying proceeds, in order to maintain homogeneity in the mixture. The Pb(NO₃)₂ is dissolved in the methyl alcohol and must be deposited uniformly throughout the mixture when drying is complete.

III. Firing

The dry mixture is fired in a clean air atmosphere in covered containers of fused silica. The furnace in which the material is fired should be lined with high purity (99.98%) SiO₂.

The mixture is placed in the furnace at 800°C. The temperature is then raised to 1050°C in about one hour and allowed to remain at this temperature ½ hour. The furnace temperature is then lowered to 800°C at the linearly decreasing rate of 200°/hr., and the phosphor is removed.

IV. Particle Size Separation

The preferred technique of separating the particles to obtain a uniform particle size is elutriation. When the phosphor is deposited by an electrophoretic technique as discussed below, elutriation takes place when the phosphor is placed in a slurry to be used in the electrophoretic deposition.

V. Three Presently Available Techniques are Particularly Suitable for Deposition of the Phosphor Screen Electrophoretic processes are described in the U.S. Pat. No. 2,851,408 — Cerulli and in copending applications. Another suitable deposition technique is to disperse the phosphor in a liquid and settle it to form the desired screen. Finally, silk screening deposition techniques may be used to deposit a coating of BaSi₂O₅:Pb.

Figure 2:
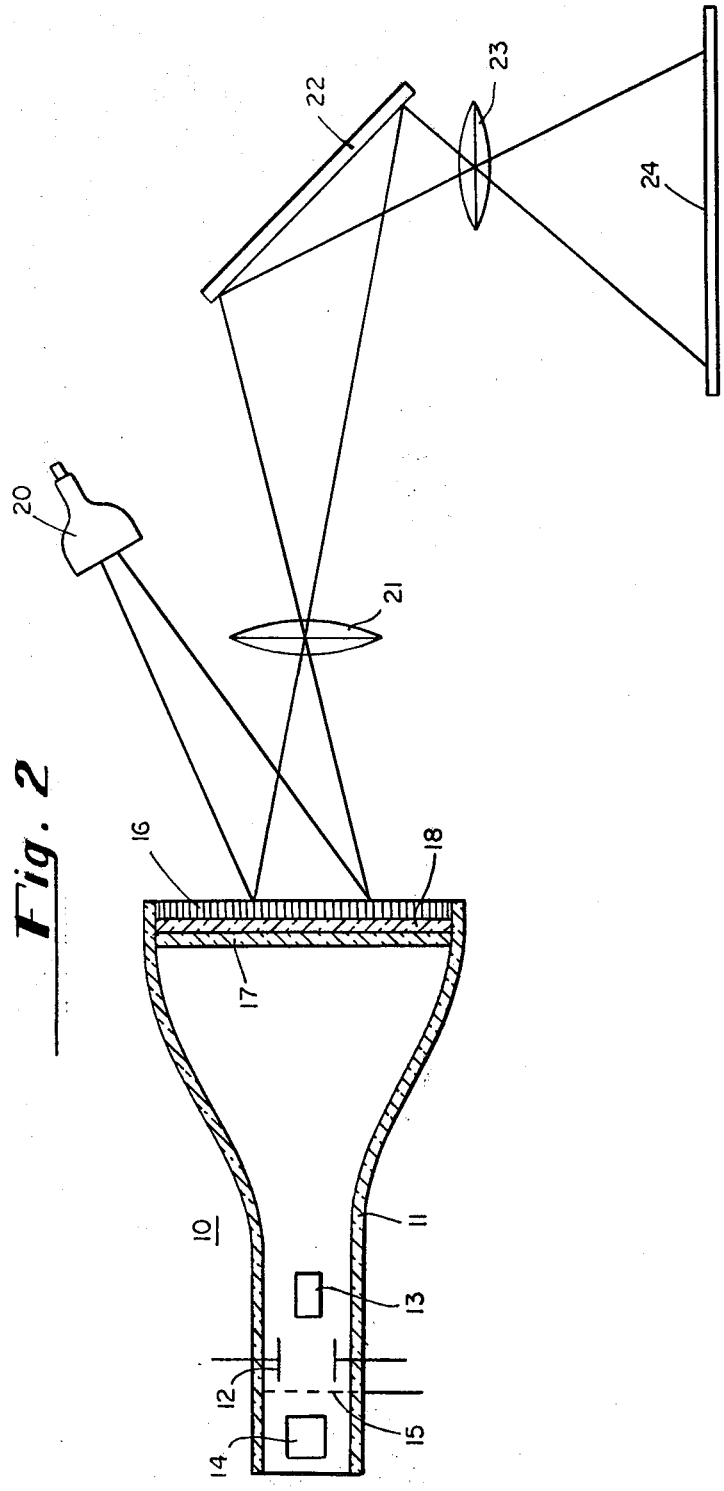
FIG. 2 shows an information storage and display device using a plate of photochromic glass and the improved $BaSi_2O_5$:Pb phosphor.

The high conversion efficiency of BaSi₂O₅:Pb phosphor may be advantageously utilized in a cathode ray tube in a system of the type shown in FIG. 2. This includes a tube 10 having a conventional envelope 11, vertical and horizontal deflection plates 12 and 13 respectively, an electron gun 14 and a beam intensity control electrode 15. The faceplate includes a photochromic glass or fiber optic plate 16. The plate of photochromic glass 16 is selectively darkened by light from the phosphor screen 17 which, in accordance with this invention, is BaSi₂O₅:Pb having a high conversion efficiency for ultraviolet emission. Electron bombardment from the electron beam excites the BaSi₂O₅:Pb which emits light having a high ultraviolet light component. This light passes through a dichroic layer 18 which transmits ultraviolet light having a wavelength around 350 millimicrons.

Several different readout systems are suitable for use with a cathode ray display tube of this type. The one shown in FIG. 2 includes a probing light source 20 which directs a beam of light onto the faceplate. The wavelength of light emitted by the source is around 510 millimicrons, the optimum probing frequency to provide a projected image having high contrast. Light from the source 20 passes through the fiber optic layer 16, is reflected by the dichroic layer 18 and again passes back through the fiber optic layer 16. The light is transmitted by lens 21, is reflected by mirror 22 and passes through the projection lens 23 to a front or rear screen 24 for display purposes. The darkened area in the photochromic glass which may form characters, vectors, curves, etc., blocks the transmission of projection light through the glass and forms a dark character on a green background.

The high efficiency BaSi₂O₅:Pb phosphor has been evaluated based on measurements made on thin screens. The screens, for the most part, were deposited by either the electrophoretic process described in copending application, Ser. No. 38,296, filed May 18, 1970 now U.S. Pat. No. 3,681,222, or by centrifugal settling. In the centrifugal settling process, a particle size separation is first carried out by gravity settling, so as to have an average particle size of about 4 microns and 95 percent or more of the particles less than 10 microns. The desired weight of powder is dispersed in a solution of potassium silicate. The phosphor is then centrifuged onto a known area, including the substrate to be coated, giving a screen of known weight per unit area. The binder solution is siphoned off and the screen is dried, lacquered, aluminized, and baked.

Luminescence measurements were made in a demountable cathode ray tube having a split grounded anode so that only the current in the electron beam is measured, not total cathode current. A Varian Vac-Sorb roughing pump and Varian Vac-Ion pump having a 15 liter/sec. capacity were used in the system.

The primary photometric capability was provided by an EG&G Model 580/585 Spectroradiometer System. Absolute energy measurements of radiated light output per unit wavelength could be made, or the total radiated power could be determined for a known spectrum using the detector head alone as a radiometer. Thus, using the known beam power input to the phosphor screen, the conversion efficiency could be determined in terms of watts radiated power per watt electrical input power (or percent).

Figure 3:
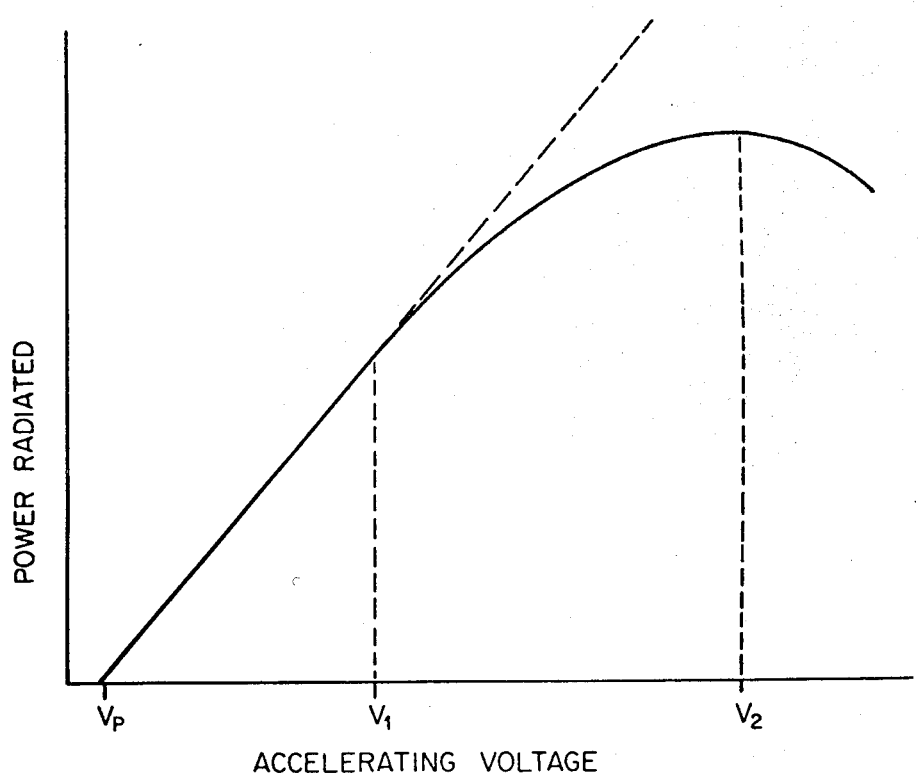
FIG. 3 is a penetration curve for a phosphor screen.

A useful technique for characterizing a phosphor screen is to measure the intensity for various accelerating voltages, all other parameters remaining constant. The penetration curve in FIG. 3 represents a plot of such data. At lower accelerating voltages, the beam is totally absorbed in the phosphor screen; therefore all the power in the beam is dissipated in the phosphor except that lost in the dead layer. The dead layer includes all non-luminescent matter, such as the aluminum backing and grain surfaces, which the electron beam must traverse before any luminescence can be produced. The radiated power is therefore given in this region by $$L = \eta (P_b - P_d) \tag{1}$$

where
$L$ = (Luminescence) radiated power
$\eta$ = Phosphor conversion efficiency
$P_b$ = Total power in the beam
$P_d$ = Power lost in dead layer
and since current, $I$, is held constant $$L = \eta I (V_a - V_d) \tag{2}$$

where $V_a$ = accelerating voltage, and $V_d$ = minimum voltage required for penetrating the dead layer. This expression shows the linear nature of the curve at low accelerating voltage. The maximum voltage on the linear region of the curve represents the point at which some of the electrons just penetrate through the phosphor screen. Above this voltage $V_1$ some of the energy of the beam is lost in the substrate and is not available for producing luminescence. Thus the curve becomes sub-linear, that is, the screen conversion efficiency decreases. The voltage $V_1$ represents the penetration of the thinnest regions of the screen. As there are some thicker regions still totally absorbing the beam energy, the total energy deposited in the screen continues to rise up to voltage $V_2$ where the thickest portions of the phosphor screen are also penetrated. At still higher voltages, no further gain in radiated output can be realized; indeed the total emission begins to fall off due to the lower energy loss per unit path length of the higher energy electrons.

The conversion efficiency can be determined from the penetration curve data using equation (2). But in order to obtain a value of efficiency which is characteristic of the phosphor, rather than of some screen property, the efficiency in the linear region of the curve must be used.

In actual tests of the efficiencies of phosphor batches prepared under the optimum conditions described above, maximum efficiencies of 4.1 – 5.6 percent were obtained in nearly all cases with and without the addition of boron. This is contrasted to the maximum efficiency of 3.3 percent obtained in a test of a commercially available phosphor under the same test conditions. Although an efficiency of 4.0 percent or more can be achieved without the addition of boron, it has been found that a 10 to 15 percent increase in efficiency can be obtained when boron is added to the prefired mixture produced in accordance with this invention. It is believed that the mechanism for this increased efficiency is the more efficient removal of fluoride as explained previously.

Figure 4:
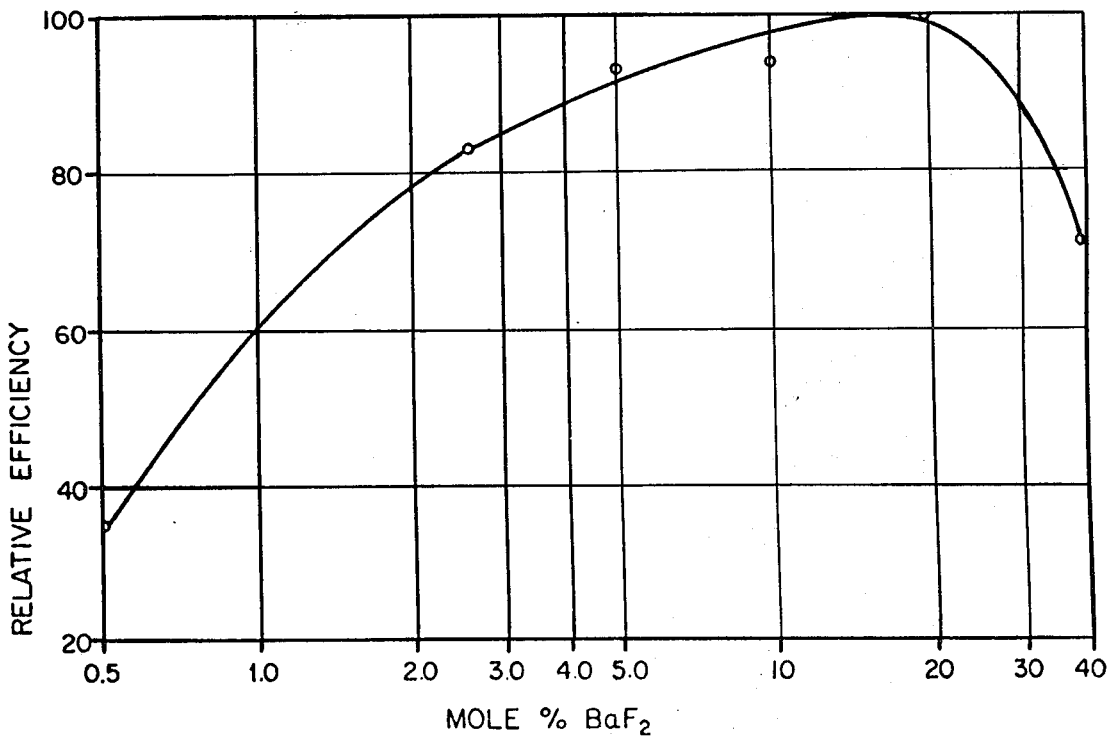
FIG. 4 is a graph showing the effect of $BaF_2$ on phosphor efficiency.

It has also been found that the efficiency of the phosphor varies as a function of $BaF_2$ as shown in FIG. 4. The abscissa represents the $BaF_2$ content as a mole percentage of total barium. The ordinant represents the relative efficiency. As clearly shown in FIG. 4, the optimum efficiency as a function of $BaF_2$ content is about 20 M%. FIG. 4 applies to phosphors in which the fluoride is properly compensated by $H_3BO_3$. If boric acid is not used, a lower $BaF_2$ content ($\sim$10M%) is optimum.

What is claimed is:
1. A method of making a barium disilicate phosphor doped with lead comprising the steps of
    mixing a slurry comprising $BaCO_3$, $BaF_2$, $Pb(NO_3)_2$ and granular $SiO_2$ in methyl alcohol with $H_3BO_3$, said $SiO_2$ having particles of 0.01 microns in size so as to diffuse through said slurry forming a substantially homogeneous suspension, and
    firing said mixture at a temperature substantially in excess of 800°C. so as to form the barium disilicate phosphor doped with lead,
    said $BaCO_3$, said $BaF_2$, said $Pb(NO_3)_2$, said granular $SiO_2$ and said $H_3BO_3$ reacting during firing in a ratio of 1.6 moles $BaCO_3$ to 0.4 moles $BaF_2$ to 0.02 moles $Pb(NO_3)_2$ to 4.0 moles $SiO_2$ to 0.267 moles $H_3BO_3$ so as to produce barium disilicate phosphor capable of an ultraviolet emission under electron bombardment.
2. The method of claim 1 further comprising the steps of placing the mixture in a high purity silica container and firing in a furnace lined with high purity fused quartz.

* * * * *